US012640617B2

(12) United States Patent
Deng et al.

(10) Patent No.: US 12,640,617 B2
(45) Date of Patent: May 26, 2026

(54) ELECTRIC DRIVE ASSEMBLY SYSTEM, VEHICLE AND METHOD FOR ASSEMBLING ELECTRIC DRIVE ASSEMBLY SYSTEM

(71) Applicant: Valeo eAutomotive Germany GmbH, Erlangen (DE)

(72) Inventors: Xiaoxue Deng, Erlangen (DE); Yejin Jin, Erlangen (DE); Binhong Liao, Erlangen (DE); Xing-Ang Cheng, Erlangen (DE); Shu Zhang, Erlangen (DE); Lei Sun, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 423 days.

(21) Appl. No.: 18/337,845

(22) Filed: Jun. 20, 2023

(65) Prior Publication Data

US 2023/0412039 A1      Dec. 21, 2023

(30) Foreign Application Priority Data

Jun. 20, 2022    (CN) .......................... 202210698418.9

(51) Int. Cl.
H02K 3/50      (2006.01)
H02K 5/22      (2006.01)
(Continued)

(52) U.S. Cl.
CPC .............. H02K 5/225 (2013.01); H02K 3/50 (2013.01); H02K 7/006 (2013.01); H02K 15/14 (2013.01); *H02K 2203/09* (2013.01)

(58) Field of Classification Search
CPC .......... H02K 3/50; H02K 5/225; H02K 7/116; H02K 7/006; H02K 15/14; H02K 11/30; H02K 11/33; H02K 2203/09; H02K 5/15
(Continued)

(56) References Cited

U.S. PATENT DOCUMENTS

2020/0266680 A1      8/2020  Fujimoto et al.
2022/0173641 A1*     6/2022  Fujimoto ............... H02K 5/203

FOREIGN PATENT DOCUMENTS

CN        105216598 A      1/2016
CN        112840535 A      5/2021
(Continued)

OTHER PUBLICATIONS

Ishikawa et al, Motor Unit, Aug. 26, 2021, WO 2021166299 (English Machine Translation) (Year: 2021).*
(Continued)

*Primary Examiner* — Alexander A Singh

(74) *Attorney, Agent, or Firm* — Oblon, McClelland, Maier & Neustadt, L.L.P.

(57)      ABSTRACT

An electric drive assembly system, a vehicle and a method for assembling an electric drive assembly system. The electric drive assembly system includes a housing including a main body and a cover. Disposed in the housing is an electric machine including a rotor shaft and a gearbox assembly which includes a gear input shaft connected to the rotor shaft and disposed coaxially therewith, to receive torque from the electric machine. An electric machine control module is configured to control the electric machine, and superposed with the electric machine and/or the gearbox assembly in a direction transverse to the gear input shaft. An electrical connection assembly, configured to electrically connect the electric machine control module to a stator of the electric machine.

18 Claims, 4 Drawing Sheets

(51) Int. Cl.
    *H02K 7/00*           (2006.01)
    *H02K 15/14*         (2006.01)
(58) Field of Classification Search
    USPC ....................................................... 310/71, 89
    See application file for complete search history.

(56)                References Cited

FOREIGN PATENT DOCUMENTS

| | | | |
|---|---|---|---|
| CN | 114312266 A | 4/2022 | |
| CN | 114391217 A | 4/2022 | |
| JP | 2021-29060 A | 2/2021 | |
| WO | WO 2021/044809 A1 | 3/2021 | |
| WO | WO-2021166299 A1 * | 8/2021 | ............... H02K 9/19 |

OTHER PUBLICATIONS

Extended European Search Report issued Nov. 16, 2023 in European Patent Application No. 23180114.3, 9 pages.

\* cited by examiner

512

511

22    52                    4

511

5

21                          6

3

1

4

512

41

18

10

5

1

2

3

21

ELECTRIC DRIVE ASSEMBLY SYSTEM, VEHICLE AND METHOD FOR ASSEMBLING ELECTRIC DRIVE ASSEMBLY SYSTEM

TECHNICAL FIELD

The present disclosure relates to the field of vehicles, in particular to an electric drive assembly system, a vehicle comprising the electric drive assembly system, and a method for assembling the electric drive assembly system.

BACKGROUND

An electric drive assembly system is an important component part of a vehicle, comprising an electric machine, a gearbox assembly and an electric machine controller. In a known solution, an electrical connection assembly between the electric machine controller and the electric machine is disposed at a non-drive end of an electric machine rotor shaft, while the connection between the electric machine and the gearbox assembly, etc, is disposed at a drive end of the electric machine rotor shaft.

The length of the electric machine or the power of the electric machine is determined by the length between the drive end and the non-drive end of the electric machine rotor shaft. Various apparatuses are fitted at both the drive end and the non-drive end of the electric machine rotor shaft, for example the electrical connection assembly of the electric machine and the electric machine controller (e.g. inverter) is arranged at the non-drive end; thus, in the case of a known electric drive assembly system, a change in the length of the electric machine will affect the electrical connection assembly between the electric machine and the inverter. For this reason, if it is desired to change the electric machine length, the electrical connection assembly needs to be redesigned.

In addition, the electrical connection assembly disposed at the non-drive end of the electric machine rotor shaft is cooled by air, with low cooling efficiency.

Further, the total length of a known electric drive assembly system is long, and there is often insufficient space to install such a long electric drive assembly system at a position close to the centre of the vehicle; for this reason, it is generally disposed at a position offset from the centre of the vehicle. This increases the difference in length between a left drive shaft and a right drive shaft of the vehicle, and it is even necessary to have an additional shaft disposed between the left drive shaft and the right drive shaft to balance the length difference.

Thus, an electric drive assembly system capable of solving the abovementioned problems is needed in the art.

SUMMARY

Thus, an objective of the present disclosure is to provide an electric drive assembly system, a vehicle comprising the electric drive assembly system, and a method for assembling the electric drive assembly system. In the electric drive assembly system, an electrical connection assembly between an electric machine control apparatus and an electric machine is installed at a drive end of an electric machine rotor shaft, so that the length of the electric machine can be changed without the need to redesign the electrical connection assembly. In addition, the electrical connection assembly in the electric drive assembly system may be cooled by cooling oil of a gearbox assembly, so the cooling efficiency is higher. Further, the electric drive assembly system can reduce the difference in length between a left drive shaft and a right drive shaft of the vehicle.

In one aspect, the present disclosure provides an electric drive assembly system, comprising:

a housing, comprising a main body and a cover; and the following, disposed in the housing:

an electric machine, comprising a rotor shaft;

a gearbox assembly, comprising a gear input shaft connected to the rotor shaft and disposed coaxially therewith, to receive torque from the electric machine;

an electric machine control module, configured to control the electric machine, and superposed with the electric machine and/or the gearbox assembly in a direction transverse to the gear input shaft; and an electrical connection assembly, configured to electrically connect the electric machine control module to a stator of the electric machine, wherein the electrical connection assembly is configured to be electrically connected to the stator of the electric machine close to a drive end of the rotor shaft of the electric machine, and wherein the main body of the housing is provided with at least one opening in a sidewall protruding from the drive end of the rotor shaft, and the electrical connection assembly passes through the opening.

In one embodiment, the electrical connection assembly comprises multiple busbars, an injection-moulded member and a sealing member, the injection-moulded member being disposed on the busbars and closing the opening, and the sealing member being disposed between the injection-moulded member and the sidewall.

In one embodiment, the injection-moulded member is formed on the multiple busbars by injection-moulding.

In one embodiment, the busbars pass through the opening, and comprise first portions connected to the stator and second portions connected to the electric machine control module.

In one embodiment, the cover comprises a gearbox cover, an electric machine cover and a control module cover, wherein the first portions are located in a first accommodating space defined by the gearbox cover and the main body of the housing and at least partially extend transversely with respect to the gear input shaft, and the second portions are located in a second accommodating space defined by the control module cover and the main body of the housing.

In one embodiment, the electrical connection assembly is fixed to the main body by means of a connecting member.

In one embodiment, the electric machine control module comprises multiple output ends corresponding to the multiple busbars, the multiple output ends being arranged in a direction parallel to the direction of extension of the gear input shaft.

In one embodiment, the electric machine control module comprises multiple output ends corresponding to the multiple busbars, the multiple output ends being arranged in a direction perpendicular to the direction of extension of the gear input shaft.

In one embodiment, the second portions extend parallel to the direction of extension of the gear input shaft.

In one embodiment, the first portions and/or the second portions are arranged side by side in their respective width directions, or at least partially arranged side by side in their respective thickness directions.

In one embodiment, the multiple busbars pass through the same opening or multiple corresponding openings in the sidewall.

In another aspect, the present disclosure provides a vehicle, comprising the electric drive assembly system as described above.

In another aspect, the present disclosure provides a method for assembling an electric drive assembly system, the assembly method comprising the following steps:

installing an electric machine in a housing of the electric drive assembly system;

at a drive end of a rotor shaft of the electric machine, inserting an electrical connection assembly from outside a main body of the housing into at least one opening provided in a sidewall of the main body;

connecting the electrical connection assembly to a stator of the electric machine;

installing a gearbox assembly and an electric machine control module in the housing; and connecting the electrical connection assembly to the electric machine control module.

In one embodiment of the method, the electric drive assembly system is configured as described above.

BRIEF DESCRIPTION OF THE DRAWINGS

In order to explain the technical solution in embodiments of the present disclosure more clearly, the drawings accompanying embodiments of the present disclosure are briefly described below. The drawings are merely used to illustrate some embodiments of the present disclosure, without limiting all embodiments of the present disclosure to this. Among the drawings.

DETAILED DESCRIPTION

Figure 1:
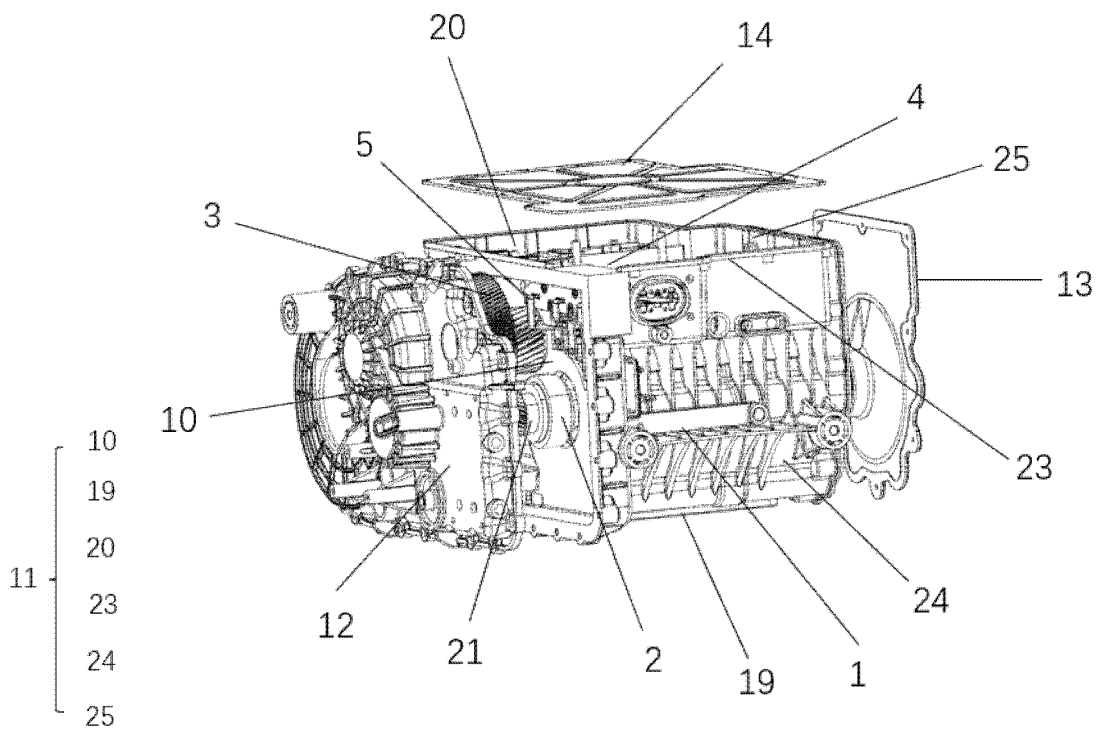
FIG. 1 shows a schematic drawing of an electric drive assembly system according to an embodiment of the present disclosure.

In order to clarify the technical solution objective, the technical solution and advantages of the present disclosure, the technical solution of embodiments of the present disclosure is described clearly and completely below in conjunction with the drawings accompanying particular embodiments of the present disclosure. In the drawings, identical reference numerals denote identical components. It must be explained that the embodiments described are some, not all, of the embodiments of the present disclosure. All other embodiments obtained by those skilled in the art based on the described embodiments of the present disclosure without the need for inventive effort shall fall within the scope of protection of the present disclosure.

Unless otherwise defined, the technical or scientific terms used herein shall have the common meanings understood by those skilled in the art. "First", "second" and similar words used in the description and claims of the patent application of the present disclosure do not indicate any order, quantity or importance, being merely used to distinguish between different component parts. Likewise, words such as "a" or "one" do not necessarily represent a quantity limit Words such as "comprising", "including" or "having" mean that the element or object preceding the word covers the elements or objects and equivalents thereof listed after the word, without excluding other elements or objects. Words such as "connection" or "communication", rather than being limited to the physical or mechanical connection or communication shown in a drawing, may include connection or communication equivalent thereto, irrespective of whether it is direct or indirect. "Upper", "lower", "left", "right", etc. are only used to indicate a relative positional relationship, and when the absolute position of the described object changes, the relative positional relationship might also change accordingly.

Figure 2:
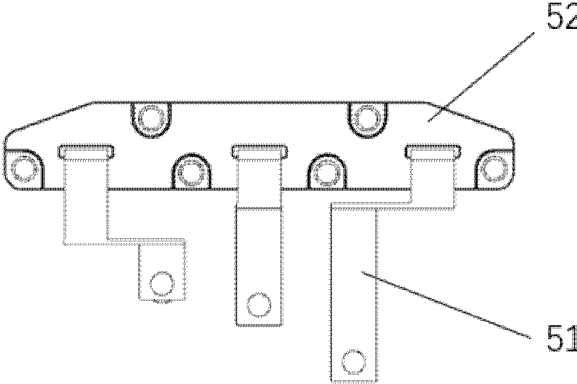
FIG. 2 shows a schematic drawing of an electrical connection assembly of the electric drive assembly system in FIG. 1.
Figure 3:
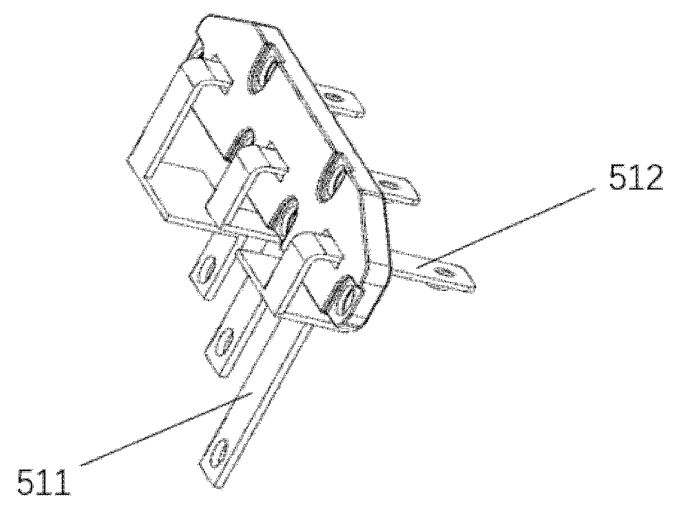
FIG. 3 shows an oblique view of the electrical connection assembly in FIG. 2.
Figure 4:
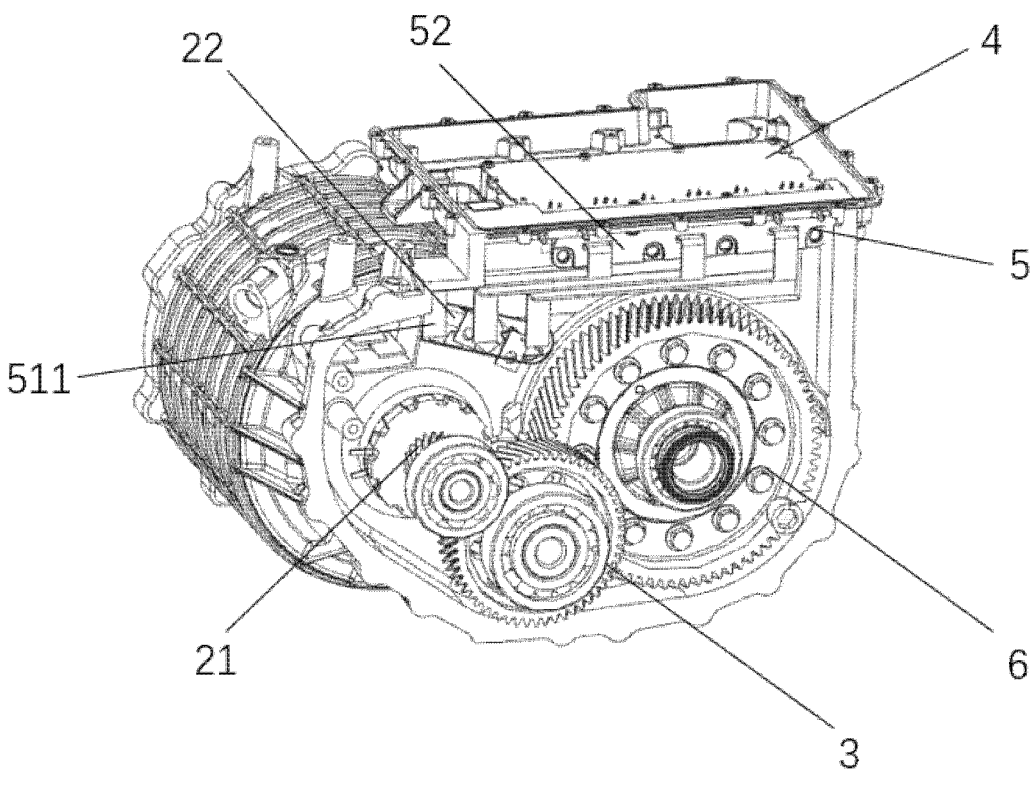
FIG. 4 shows a schematic drawing of an electric drive assembly system according to another embodiment of the present disclosure.
Figure 5:
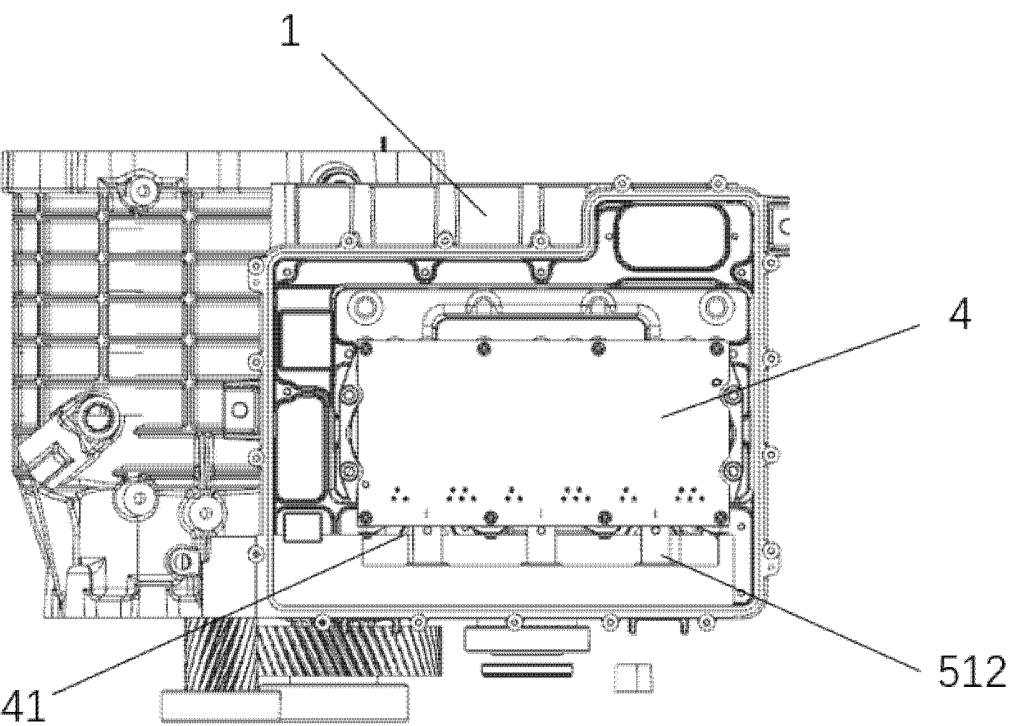
FIG. 5 shows a top view of the electric drive assembly system in FIG. 4.
Figure 6:
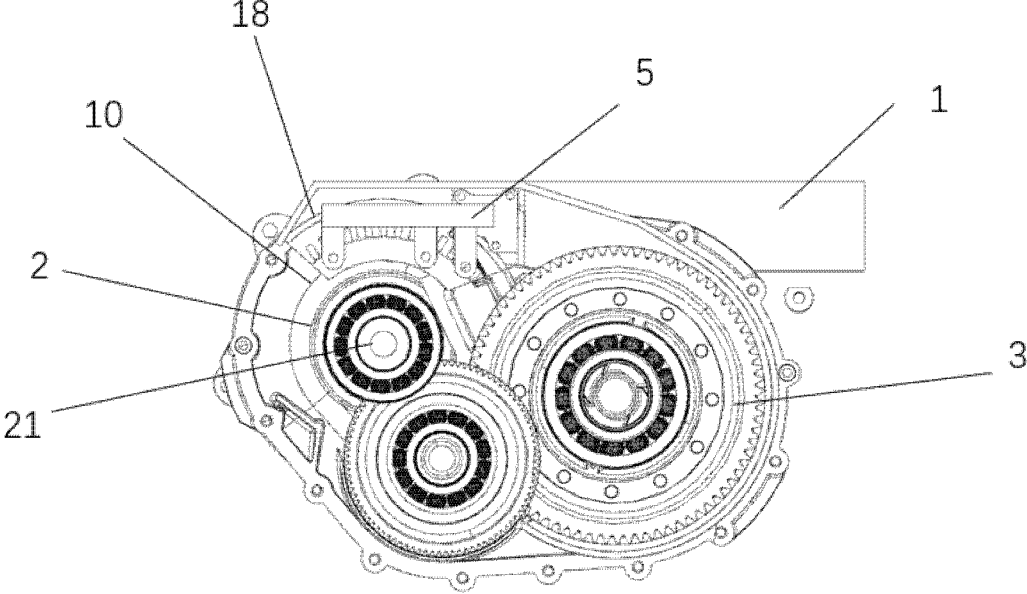
FIG. 6 shows a schematic drawing of an electric drive assembly system according to another embodiment of the present disclosure.
Figure 7:
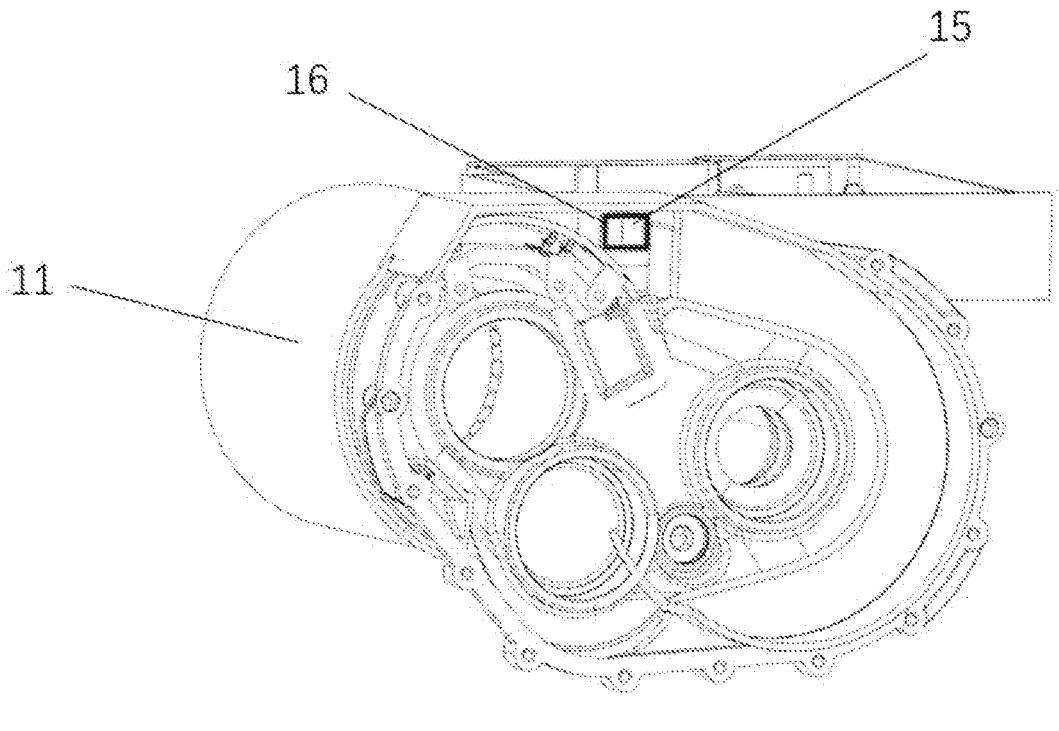
FIG. 7 shows an oblique view of the housing of the electric drive assembly system in FIG. 6.
Figure 8:
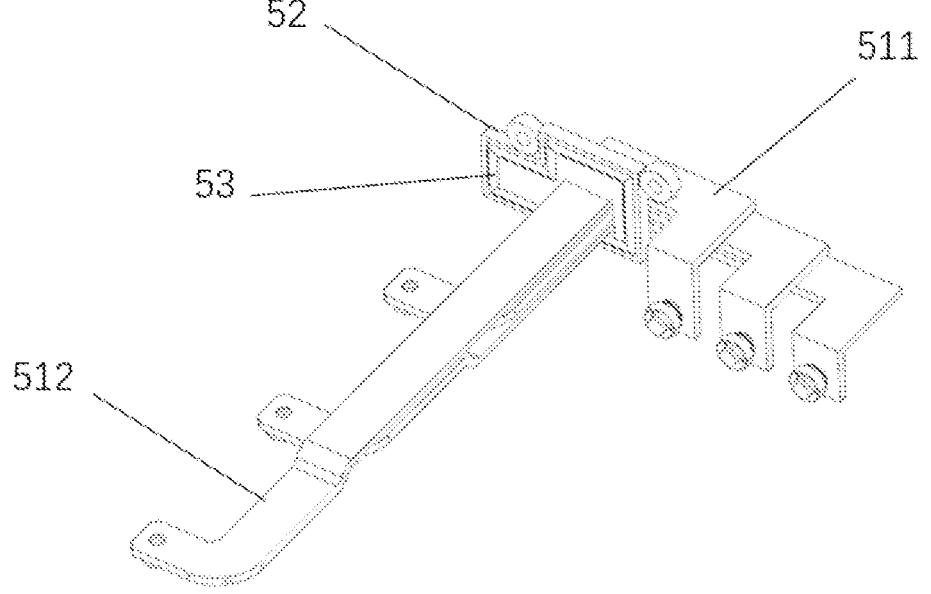
FIG. 8 shows a schematic drawing of an electrical connection assembly of an electric drive assembly system according to another embodiment of the present disclosure.

Preferred embodiments of an electric drive assembly system for a vehicle according to the present disclosure are described in detail below with reference to FIGS. 1-8. FIGS. 1-3 show an electric drive assembly system contained in a vehicle, and an electrical connection assembly thereof, according to an embodiment of the present disclosure. FIGS. 4-5 show an electric drive assembly system contained in a vehicle according to another embodiment of the present disclosure. FIGS. 6-7 show an electric drive assembly system contained in a vehicle, and an electrical connection assembly thereof, according to another embodiment of the present disclosure. FIG. 8 shows an electrical connection assembly of an electric drive assembly system contained in a vehicle according to another embodiment of the present disclosure. The differences between these embodiments are mainly differences in electric machine control modules and/or electrical connection assemblies.

As shown in FIG. 1, the electric drive assembly system of the present disclosure comprises a housing 1, the housing 1 comprising a main body 11 and a cover. In addition, the electric drive assembly system comprises an electric machine 2, a gearbox assembly 3, an electric machine control module 4 and an electrical connection assembly 5, all of which are disposed in the housing 1. The electric machine control module 4 may for example be an inverter, which converts DC power to AC power of fixed frequency and fixed voltage or adjustable frequency and adjustable voltage, for input to the electric machine 2. The electric machine 2 is for example a permanent magnet synchronous electric machine or an AC asynchronous electric machine. The electric machine 2 is drive-connected to the gearbox assembly 3, to output the torque of the electric machine 2 after speed reduction in the gearbox assembly 3. The electric machine control module in FIG. 1 is located in the housing and therefore not visible; the reference numeral 4 merely indicates its position schematically. For the actual electric machine control module, see FIG. 4. By installing apparatuses such as the electric machine 2, the gearbox assembly 3 and the electric machine control module 4 in one housing, a highly integrated design of the electric drive assembly system can be achieved, thereby saving space.

Specifically, the electric machine 2 has a rotor shaft (not shown in the figure). The electric machine 2 may comprise a rotor and a stator 22. The part of the electric machine that is fixed and immovable is called the stator, while the part capable of rotating is the rotor. For example, the stator is formed of a core, a winding and a base; the core is generally formed of stacked silicon steel plates. The rotor is mounted and fixed on the base by means of a bearing or bushing, and comprises the rotor shaft and a rotor core mounted on the rotor shaft. The electric machine control module 4 is connected to wiring terminals of the stator so as to input AC power to the stator, thereby generating a rotating magnetic field. The rotor is cut by magnetic force lines in the rotating magnetic field, and thus generates an output current. In addition, the wheels of the vehicle can drive the rotor in reverse, inducing a rotating magnetic field in the other direction, to deliver electric power back to the battery via the electric machine control module 4, which is an inverter.

The gearbox assembly 3 has a gear input shaft 21, the gear input shaft 21 being connected to the rotor shaft and disposed coaxially therewith, to receive torque from the electric machine. For example, the gear input shaft 21 may be rotatably fixed to the rotor shaft of the electric machine. It should be understood that the rotor shaft and gear input shaft may be two different shafts rotatably connected by a connecting element (e.g. connected by splines), or may be the same shaft; no restriction is imposed here.

The gearbox assembly 3 may further comprise an intermediate shaft gear-meshed with the gear input shaft 21, and a differential assembly (such as the differential 6 shown in FIG. 6), which can output the torque generated by the electric machine 2 after speed reduction. The configuration of the gearbox assembly 3 is a common approach in the art, so is not described in detail in the present disclosure.

The electric machine control module 4 is configured to control the electric machine 2. The electric machine control module 4 may comprise various electronic control elements and electrical control elements, and for example takes the form of a circuit board. Through control of an insulated-gate bipolar transistor (IGBT) integrated power module by the electronic control elements and electrical control elements, the electric machine control module 4 can output a controllable three-phase sine AC current, thereby controlling the rotation speed and torque of the electric machine. The electric machine control module 4 is common in the art, so is not described in detail in the present disclosure.

In addition, the electric machine control module 4 is superposed with the electric machine 2 and/or the gearbox assembly 3 in a direction transverse to the gear input shaft 21. For example, the electric machine control module 4 in FIG. 1 is superposed with the electric machine 2 in a vertical direction perpendicular to the gear input shaft 21; in simple terms, the electric machine control module 4 and the electric machine 2 may be described as being superposed. In other examples, e.g. as shown in FIGS. 4 and 6-7, the electric machine control module 4 is superposed with the gearbox assembly 3 in the vertical direction perpendicular to the gear input shaft 21; in simple terms, the electric machine control module 4 and the gearbox assembly 3 may be described as being superposed. It may also be said that the electric machine control module 4 in FIGS. 4 and 6-7 is superposed with the electric machine 2 in a direction transverse to the gear input shaft 21 and inclined relative to the vertical direction in the figures. The specific position where the electric machine control module 4 is disposed depends on the arrangement of the electronic components of the electric machine control module 4, the form of the housing 1, or the configuration of the electric machine 2 and the gearbox assembly 3.

As shown in FIG. 1, the cover comprises a gearbox cover 12, an electric machine cover 13, and a control module cover 14. As shown in FIG. 2, the control module cover 14 may be located at the top of the main body 11, with the gearbox cover 12 and the electric machine cover 13 located at two ends of the main body 11, i.e. at a drive end and a non-drive end of the electric machine rotor shaft. The gearbox assembly 3 is disposed in a first accommodating space formed by the main body 11 and the gearbox cover 12. The electric machine control module 4 is disposed in a second accommodating space formed by the main body 11 and the control module cover 14. The electric machine 2 is disposed in a third accommodating space formed by the main body 11 and the electric machine cover 13. Specifically, the main body 11 of the housing comprises a base part 19 and multiple walls extending away from the base part towards a top edge 23 thereof, e.g. a sidewall 10 protruding from the drive end of the rotor shaft, a first wall 20, a second wall 24 and a third wall 25. The sidewall 10, first wall 20, second wall 24 and third wall 25 may for example be walls extending perpendicular to the base part 19. The third wall 25 is located close to the non-drive end of the electric machine rotor shaft. The first wall 20 and second wall 24 extend between the sidewall 10 and the third wall 25. In addition, as described above, the main body 11 further comprises a top wall (not shown in the figures), on which the electric machine control module 4 is mounted. The sidewall 10 may be bent close to the top edge 23, so as to define the first accommodating space together with the gearbox cover 12. The top wall may be depressed relative to the top edge 23, so as to define the second accommodating space together with the control module cover 14. The second wall 24 together with the top wall, the sidewall 10 and the electric machine cover 13 define the third accommodating space. In other examples, the second wall 24 for example partially takes the form of a cylinder.

The electrical connection assembly 5 is configured to electrically connect the electric machine control module 4 to the stator 22 of the electric machine 2, more precisely, to the wiring terminals of the stator 22. The electrical connection assembly 5 is configured to be electrically connected to the stator 22 of the electric machine 2 close to the gear input shaft 21; for the position of the stator 22, see FIG. 4. In other words, the electrical connection assembly 5 is configured to be electrically connected to the stator 22 close to the drive end of the rotor shaft of the electric machine. As shown in FIGS. 1, 4 and 6, the main body 11 of the housing 1 is provided with an opening in the sidewall 10 protruding from the drive end of the rotor shaft, and the electrical connection assembly 5 passes through the opening, e.g. the opening 15 shown in FIG. 7. For example, the opening is located close to the drive end of the rotor shaft of the electric machine, in an unoccupied region of the sidewall 10 above the gear input shaft 21 or the differential 6. Thus, the electric drive assembly system of the present disclosure can utilize more effectively the space at the drive end of the rotor shaft of the electric machine which is not occupied by the gearbox assembly or the differential, thus realizing a design with a higher degree of integration.

As a result of having the electrical connection assembly 5 disposed close to the drive end of the electric machine rotor shaft of the electric drive assembly system, the non-drive end thereof is expandable; that is to say, the main body 11 of the housing 1 is extendable in the direction towards the electric machine cover 13, i.e. the length of the stator or electric machine accommodated therein can be altered, without any need to redesign the electric machine control module and the electrical connection assembly. Thus, the electric drive assembly system of the present disclosure has application flexibility and a low cost. In addition, cooling oil stored in the gearbox assembly 3 can splash onto and cool a first portion 511 of the electrical connection assembly 5, the first portion being located in the first accommodating space that accommodates the gearbox assembly. Thus, the electric drive assembly system of the present disclosure has higher cooling efficiency.

As shown in FIG. 2, the electrical connection assembly 5 comprises multiple busbars 51 (e.g. copper busbars) and an injection-moulded member 52. The number of busbars 51 may be three, used for three phases of current respectively. The injection-moulded member 52 is disposed on the busbars 51 and closes the opening 15, see FIG. 7. For example, the injection-moulded member 52 may be formed on the multiple busbars 51 by injection moulding. In addition, to seal the second accommodating space accommodating the electric machine control module 4 relative to the first accommodating space accommodating the gearbox assembly 3, the electrical connection assembly 5 may further comprise a sealing member (not shown in FIG. 2), the sealing member being disposed between the injection-moulded member 52 and the sidewall 10 of the housing 1. As shown in FIG. 7, the sealing member may be installed in a groove 16 around the opening 15. In other examples, the sealing member may be installed in a groove on the side of the injection-moulded member 52 that faces the opening, e.g. the sealing member 53 shown in FIG. 8. For example, the sealing member 53 may be formed integrally with the busbars 51 and the injection-moulded member 52, or may be a separate component. In addition, as shown in FIGS. 1, 4 and 6, the injection-moulded member 52 is fitted to the opening from the outside of the main body 11. For example, the electrical connection assembly 5 is fixed to the main body 11 by means of a connecting member. For example, the electrical connection assembly 5 is fixed to the sidewall 10 by means of a screw or bolt passing through a mounting hole in the injection-moulded member 52. Of course, the present disclosure may also use other methods, such as bonding, riveting, welding, etc.

The electric machine control module 4 comprises multiple output ends 41 corresponding to the multiple busbars 51, as shown in FIG. 5. In some examples, the multiple output ends 41 are arranged in a direction parallel to the direction of extension of the gear input shaft 21. In other examples, the multiple output ends 41 are arranged in a direction perpendicular to the direction of extension of the gear input shaft 21, e.g. the embodiments in FIGS. 1, 4 and 5. As shown in FIG. 5, the arrangement direction of the multiple output ends 41 is the horizontal extension direction in the figure, which is perpendicular to the gear input shaft 21 oriented in the vertical direction.

Specifically, the busbars 51 pass through the opening, and comprise first portions 511 connected to the stator 22 and second portions 512 connected to the electric machine control module 4, as shown in FIGS. 3 and 8. The first portions 511 are located in the first accommodating space defined by the gearbox cover 12 and the main body 11 of the housing 1, and at least partially extend transversely with respect to the gear input shaft 21. Here, "transversely with respect to" includes perpendicular to the gear input shaft 21, and obliquely at an angle to the gear input shaft 21. In addition, as shown in FIG. 6, the main body 11 is provided with another opening 18 in the sidewall 10 protruding from the drive end of the rotor shaft, and the first portions 511 are electrically connected to the wiring terminals of the stator which are exposed through this other opening 18. The second portions 512 are located in the second accommodating space defined by the control module cover 14 and the main body 11 of the housing 1. As shown in FIGS. 3, 4 and

8, the first portions 511 have a bent form, and the second portions 512 extend parallel to the direction of extension of the gear input shaft 21. As shown in FIG. 3, one part of each first portion 511 extends perpendicular to the gear input shaft 21, another portion extends parallel to the gear input shaft 21, and the second portions 512 have the same length. As shown in FIGS. 4 and 5, multiple parts of the first portions 511 extend transversely to the direction of extension of the gear input shaft 21, and the second portions 512 have the same length. As shown in FIGS. 6 and 8, the first portions 511 have a bent form, and the second portions 512 extend parallel to the direction of extension of the gear input shaft 21 and have different lengths. In some examples, the first portions 511 are arranged side by side in the width direction thereof; as shown in FIGS. 2 and 3, the three first portions 511 may be spaced apart by a large distance. In other examples, the first portions 511 are at least partially arranged side by side in the thickness direction thereof. Referring to FIG. 8, parts of the three first portions 511 are arranged side by side in the thickness direction thereof, and are thus overlapping. Of course, the multiple first portions 511 may also be arranged side by side in the thickness direction in their entirety, such that when observed in the thickness direction of the first portions 511, only one first portion 511 is visible. The second portions 512 may be arranged in a similar manner to the first portions 511. As shown in FIG. 3, the second portions 512 are arranged side by side in the width direction thereof. As shown in FIG. 8, the second portions 512 are at least partially arranged side by side in the thickness direction thereof, and are thus overlapping, such that when observed in the thickness direction of the second portions 512, only one second portion 512 is visible. Compared with the electrical connection assembly in FIG. 3, the injection-moulded member of the electrical connection assembly shown in FIG. 8 has a smaller size, while the required sealing area can be reduced, making it possible to achieve a better sealing result and more effective utilization of space, with a higher degree of integration. In addition, in some examples, the multiple busbars 51 pass through the same opening in the sidewall 10. In other examples, the multiple busbars 51 pass through multiple openings in the sidewall 10, the number of openings corresponding to the number of busbars. The different designs described above in relation to the busbars depend on the configuration of the housing, the gearbox assembly and the electric machine, and it may be said that the design of the busbars depends on the remaining space at the drive end that is not occupied by the gearbox assembly and the electric machine. In this way, the electric drive assembly system of the present disclosure can utilize space at the gearbox assembly more effectively, thus realizing a design with a higher degree of integration.

The left drive shaft and right drive shaft of the vehicle are connected to the differential in the gearbox assembly, and the differential is for example offset from the centre of the vehicle. In the vehicle of the present disclosure, the electric drive assembly system described above enables a reduction in the total length of the electric machine because the electrical connection assembly between the electric machine control module and the electric machine is installed at the drive end of the electric machine rotor shaft, and it is thus possible to have the electric drive assembly system disposed closer to the centre of the vehicle, thereby reducing the difference in length between the left drive shaft and the right drive shaft. This can also reduce the probability that an additional shaft for balancing the difference in length between the left drive shaft and the right drive shaft will be used, or avoid the use of such an additional shaft.

The method for assembling an electric drive assembly system according to the present disclosure comprises the following steps: installing the electric machine 2 in the housing 1 of the electric drive assembly system; at the drive end of the rotor shaft of the electric machine 2, inserting the electrical connection assembly 5 from outside the main body 11 of the housing 1 into an opening provided in the sidewall 10 of the main body 11; connecting the electrical connection assembly 5 to the stator 22 of the electric machine 2 (more precisely, to the wiring terminals of the stator 22); installing the gearbox assembly 3 and the electric machine control module 4 in the housing 1 of the electric drive assembly system; and connecting the electrical connection assembly 5 to the electric machine control module 4. The electric drive assembly system described above may be assembled according to the assembly method. For example, the step of inserting the abovementioned electrical connection assembly 5 may specifically be performed in a direction parallel to the gear input shaft 21.

The technical features disclosed above are not limited to the disclosed combinations with other features, and those skilled in the art could make other combinations of technical features according to the objective of the invention, to achieve the objective of the present disclosure.

The invention claimed is:

1. An electric drive assembly system, wherein the electric drive assembly system comprises:

a housing, comprising a main body and a cover; and the following, disposed in the housing:

an electric machine, comprising a rotor shaft;

a gearbox assembly, comprising a gear input shaft connected to the rotor shaft and disposed coaxially therewith, to receive torque from the electric machine;

an electric machine control module, configured to control the electric machine, and superposed with the electric machine and/or the gearbox assembly in a direction transverse to the gear input shaft; and an electrical connection assembly, configured to electrically connect the electric machine control module to a stator of the electric machine, wherein the electrical connection assembly is configured to be electrically connected to the stator of the electric machine close to a drive end of the rotor shaft of the electric machine, and wherein the main body of the housing is provided with at least one opening in a sidewall protruding from the drive end of the rotor shaft, and the electrical connection assembly passes through the opening.

2. The electric drive assembly system according to claim 1, wherein the electrical connection assembly comprises multiple busbars, an injection-moulded member and a sealing member, the injection-moulded member being disposed on the busbars and closing the opening, and the sealing member being disposed between the injection-moulded member and the sidewall.

3. The electric drive assembly system according to claim 2, wherein the injection-moulded member is formed on the multiple busbars by injection-moulding.

4. A vehicle, wherein the vehicle comprises the electric drive assembly system according to claim 3.

5. The electric drive assembly system according to claim 2, wherein the busbars pass through the opening, and comprise first portions connected to the stator and second portions connected to the electric machine control module.

6. The electric drive assembly system according to claim 5, wherein the cover comprises a gearbox cover, an electric machine cover and a control module cover, wherein the first portions are located in a first accommodating space defined by the gearbox cover and the main body of the housing and at least partially extend transversely with respect to the gear input shaft, and the second portions are located in a second accommodating space defined by the control module cover and the main body of the housing.

7. A vehicle, wherein the vehicle comprises the electric drive assembly system according to claim 6.

8. The electric drive assembly system according to claim 5, wherein the electric machine control module comprises multiple output ends corresponding to the multiple busbars, the multiple output ends being arranged in a direction parallel to the direction of extension of the gear input shaft.

9. The electric drive assembly system according to claim 8, wherein the second portions extend parallel to the direction of extension of the gear input shaft.

10. The electric drive assembly system according to claim 8, wherein the first portions and/or the second portions are arranged side by side in their respective width directions, or at least partially arranged side by side in their respective thickness directions.

11. The electric drive assembly system according to claim 10, wherein the multiple busbars pass through the same opening or multiple corresponding openings in the sidewall.

12. The electric drive assembly system according to claim 5, wherein the electric machine control module comprises multiple output ends corresponding to the multiple busbars, the multiple output ends being arranged in a direction perpendicular to the direction of extension of the gear input shaft.

13. The electric drive assembly system according to claim 12, wherein the second portions extend parallel to the direction of extension of the gear input shaft.

14. The electric drive assembly system according to claim 12, wherein the first portions and/or the second portions are arranged side by side in their respective width directions, or at least partially arranged side by side in their respective thickness directions.

15. A vehicle, wherein the vehicle comprises the electric drive assembly system according to claim 5.

16. The electric drive assembly system according to claim 2, wherein the electrical connection assembly is fixed to the main body by means of a connecting member.

17. A vehicle, wherein the vehicle comprises the electric drive assembly system according to claim 2.

18. A vehicle, wherein the vehicle comprises the electric drive system according to claim 1.

* * * * *